US008717399B2

(12) United States Patent
Izotov et al.

(10) Patent No.: US 8,717,399 B2
(45) Date of Patent: May 6, 2014

(54) PROCESSING VIDEO COMMUNICATION DATA

(75) Inventors: Dmytro Izotov, London (GB); Vishnu Vardhan Vemulapalli, London (GB)

(73) Assignee: Skype, Dublin (IE)

( * ) Notice: Subject to any disclaimer, the term of this patent is extended or adjusted under 35 U.S.C. 154(b) by 1277 days.

(21) Appl. No.: 12/220,451

(22) Filed: Jul. 24, 2008

(65) Prior Publication Data

US 2009/0315973 A1 Dec. 24, 2009

(30) Foreign Application Priority Data

Jun. 18, 2008 (GB) .................................. 0811197.3

(51) Int. Cl.
*H04N 7/14* (2006.01)
(52) U.S. Cl.
USPC ........................................ 348/14.01; 709/204
(58) Field of Classification Search
USPC .................. 348/14.01–14.08, 14.09; 455/416
See application file for complete search history.

(56) References Cited

U.S. PATENT DOCUMENTS

| | | | | |
|---|---|---|---|---|
| 5,796,402 | A * | 8/1998 | Ellison-Taylor | 715/792 |
| 5,896,128 | A * | 4/1999 | Boyer | 715/716 |
| 7,443,447 | B2 * | 10/2008 | Shirakawa | 348/376 |
| 7,800,628 | B2 * | 9/2010 | Harville et al. | 345/589 |
| 2002/0093531 | A1 * | 7/2002 | Barile | 345/753 |
| 2005/0108655 | A1 * | 5/2005 | Andrea et al. | 715/798 |
| 2005/0140778 | A1 * | 6/2005 | Kim et al. | 348/14.02 |
| 2007/0050729 | A1 * | 3/2007 | Kawamura et al. | 715/781 |
| 2007/0101289 | A1 * | 5/2007 | Awada et al. | 715/784 |
| 2008/0136895 | A1 * | 6/2008 | Mareachen | 348/14.03 |
| 2008/0170058 | A1 * | 7/2008 | Ahn et al. | 345/211 |
| 2009/0109276 | A1 * | 4/2009 | Kim | 348/14.02 |

FOREIGN PATENT DOCUMENTS

| | | |
|---|---|---|
| EP | 1 847 924 A1 | 10/2007 |
| EP | 2136531 | 12/2009 |
| WO | WO 2005/009019 A2 | 1/2005 |
| WO | WO 2007/048845 A2 | 5/2007 |

OTHER PUBLICATIONS

Communication with European Search Report, EP 09 16 2911, dated Oct. 23, 2009.
"Foreign Notice of Allowance", EP Application No. 09162911.3, (Feb. 8, 2012), 5 pages.
"Foreign Office Action", EP Application No. 091626911.3, (Feb. 5, 2010), 1 page.

* cited by examiner

*Primary Examiner* — Maria El-Zoobi
(74) *Attorney, Agent, or Firm* — Sonia Cooper; Jim Ross; Micky Minhas

(57) ABSTRACT

The present invention provides a method of processing video data in a video communication system, and a corresponding program and apparatus. The method comprises: receiving first video data at a first terminal from a second terminal; generating second video data at the first terminal for transmission to the second terminal; selecting the size of a first video area for displaying the first data within a display area; and scaling the first video data to the selected size of the first area and displaying it therein. The method further comprises: determining a second video area for displaying the second data within the display area, the determination of the second area comprising at least determining a location of the second area relative to the first area in dependence on the size of the first area; and scaling the second video data to the second video area and displaying it therein.

29 Claims, 6 Drawing Sheets

PROCESSING VIDEO COMMUNICATION DATA

RELATED APPLICATION

This application claims priority under 35 U.S.C. §119 or 365 to Great Britain, Application No. 0811197.3, filed Jun. 18, 2008. The entire teachings of the above application are incorporated herein by reference.

TECHNICAL FIELD

The present invention relates to the processing of video data in a video communication system.

BACKGROUND

Packet-based communication systems allow the user of a device, such as a personal computer, to communicate across a computer network such as the Internet, in which case the packet protocol may be Internet Protocol (IP). Packet-based communication systems can be used for video communications. These systems are beneficial to the user as they are often of significantly lower cost than fixed line or mobile networks. This may particularly be the case for long-distance communication. To use a packet-based system, the user must install and execute client software on their device. The client software provides the packet-based connections as well as other functions such as registration and authentication. In addition to video communication, the client may also provide further features such as instant messaging, voice calls, voicemail and file transfer.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

In a video communication system such as a packet-based P2P system, during a video call, a first user's terminal will receive video data from a second user's terminal. This received video data typically comprises real-time video of the second user's face or body during the call. The received video data will typically be displayed in a main video area of a display on the first user's terminal.

The first user's terminal will also generate video data to send to the second user. This locally generated data typically comprises real-time video of the first user's face or body.

In addition to the received video displayed in the main area, the first user may also want to be able to view the locally generated video, i.e. the video of themselves which is being transmitted. Thus the first user's own video may be displayed back to them in another smaller video area on the display of their terminal. This is sometimes referred to as the "preview area", "preview image" or "preview video".

SUMMARY

However, there is a problem with the above in that the display area available on the user's terminal for displaying both videos is finite.

According to one aspect of the present invention, there is provided a method of processing video data in a video communication system, the method comprising: receiving first video data at a first terminal from a second terminal; generating second video data at the first terminal for transmission to the second terminal; selecting the size of a first video area for displaying the first video data within a display area of the first terminal; scaling the first video data to the selected size of the first video area and displaying it therein; determining a second video area for displaying the second video data within the display area of the first terminal, the determination of the second video area comprising at least determining a location of the second video area relative to the first video area in dependence on the size of the first video area; and scaling the second video data to the second video area and displaying it therein.

This advantageously allows for a more efficient allocation of the finite terminal display resources in a two-way video communication system, depending on the selected size of the first video area. For example, the user may vary the first video area depending on factors such as received video data rate, the available terminal display resources, and user preference; in which case it is advantageous to automatically determine the location of the second video area so as to optimise the use of the display area.

The following embodiments have been found to be particularly efficient in the allocation of display area.

The determining of the location of the second video area relative to the first video data may comprise determining an overlap of the second video area over the first video area.

The method may comprise determining a difference between the size of the first video area and the size of the display area of the first terminal; and the determination of said overlap may comprise determining an overlap of the second video area over the first video area in dependence on said difference.

The method may comprise determining whether said difference is less than a threshold; and the determination of said overlap may comprise selecting between: substantially no overlap of the second video area over the first video area if said difference is greater that the threshold, and the second video area being substantially contained within the first video area if said difference is less than the threshold.

The determination of said difference may comprise determining a difference between the width of the first video area and the width of the display area. The determination of said difference may comprise determining a difference between the height of the first video area and the height of the display area. The determination of said difference may comprise determining a difference between the area of the first video area and the area of the display area.

The determination of the second video area may comprise determining a size of the second video area in dependence on the size of the first video area.

The method may comprise establishing a video call, wherein the reception of the first data may comprise receiving real-time video data captured by a user of the second terminal, and the generation of the second data may comprise generating real-time video data captured by a user of the first terminal, the second display area being a preview area allowing the user of the first terminal to view the second video data which is to be transmitted to the second user.

The display area may be one of: a panel of a client application running on the first terminal, a window separate from a client application running on the first terminal, and a full-screen of the first terminal.

The method may comprise selecting the display area of the first terminal; and the determination of the second video area may comprise determining a difference between the size of the first video area and the size of the selected display area.

Said selection may comprise selecting the display area from one of: a panel of a client application running on the first terminal, a window separate from a client application running on the first terminal, and a full-screen of the first terminal The size of the first area may be selected by a user.

In one application of the present invention, the video communication system may comprise a packet-based communication network, said receipt of the first video data may comprise receiving the first video data from the second terminal via the packet-based communication network, and said generation of the second video data may comprise generating the second video data for transmission to the second terminal via the packet-based communication network.

The video communication system may comprise a peer-to-peer network, said receipt of the first video data may comprise receiving the first video data from the second terminal via the peer-to-peer network, and said generation of the second video data may comprise generating the second video data for transmission to the second terminal via the peer-to-peer network.

The invention has a particularly advantageous application to packet-based video communication networks, and especially peer-to peer video communication networks, where video data rates may vary. In a communication system with more guaranteed data rates, the size of the received video area may be less of an issue and there may be no need to scale it. But where video data rates may vary, a user may wish to be able to select the size of the received video area depending on the data rate, in which case the impact of the received video area on the finite display area of the receiving terminal will in turn have a variable effect on the display area available for the preview area. In that case, it will be particularly useful to be able to adapt the placing of the preview area in dependence on the size of the received video area.

According to another aspect of the present invention, there is provided a computer program product, the program comprising code which when executed on a processor may perform any of the above steps.

According to another aspect of the present invention, there is provided a first user terminal comprising: reception means for receiving first video data from a second terminal; transmission means for transmitting second video data generated at the first terminal to the second terminal; a display; a processor coupled to the display, reception means and transmission means; and storage means storing code of a client application and arranged to supply the code to the processor for execution, the code being configured so as when executed by the processor to: select the size of a first video area for displaying the first video data within a display area of said display; scale the first video data to the selected size of the first video area and display it therein; determine a second video area for displaying the second video data within the display area of the display, the determination of the second video area comprising at least determining a location of the second video area relative to the first video area in dependence on the size of the first video area; and scale the second video data to the second video area and display it therein.

According to another aspect of the present invention, there is provided a communication system comprising a communication network, a user first terminal, and a second user terminal coupled to the first terminal via the communication network, wherein: the first terminal is arranged to receive first video data from the second terminal via the communication network; the first terminal is arranged to generate second video data and transmit the second video data to the second terminal via the communication network; and the first terminal comprises a display, a processor coupled to the display, and storage means storing code of a client application and arranged to supply the code to the processor for execution, the code being configured so as when executed by the processor to: select the size of a first video area for displaying the first video data within a display area of said display; scale the first video data to the selected size of the first video area and display it therein; determine a second video area for displaying the second video data within the display area of the display, the determination of the second video area comprising at least determining a location of the second video area relative to the first video area in dependence on the size of the first video area; and scale the second video data to the second video area and display it therein.

BRIEF DESCRIPTION OF THE DRAWINGS

For a better understanding of the present invention and to show how it may be carried into effect, reference will now be made by way of example to the accompanying drawings in which.

DETAILED DESCRIPTION

Figure 1:
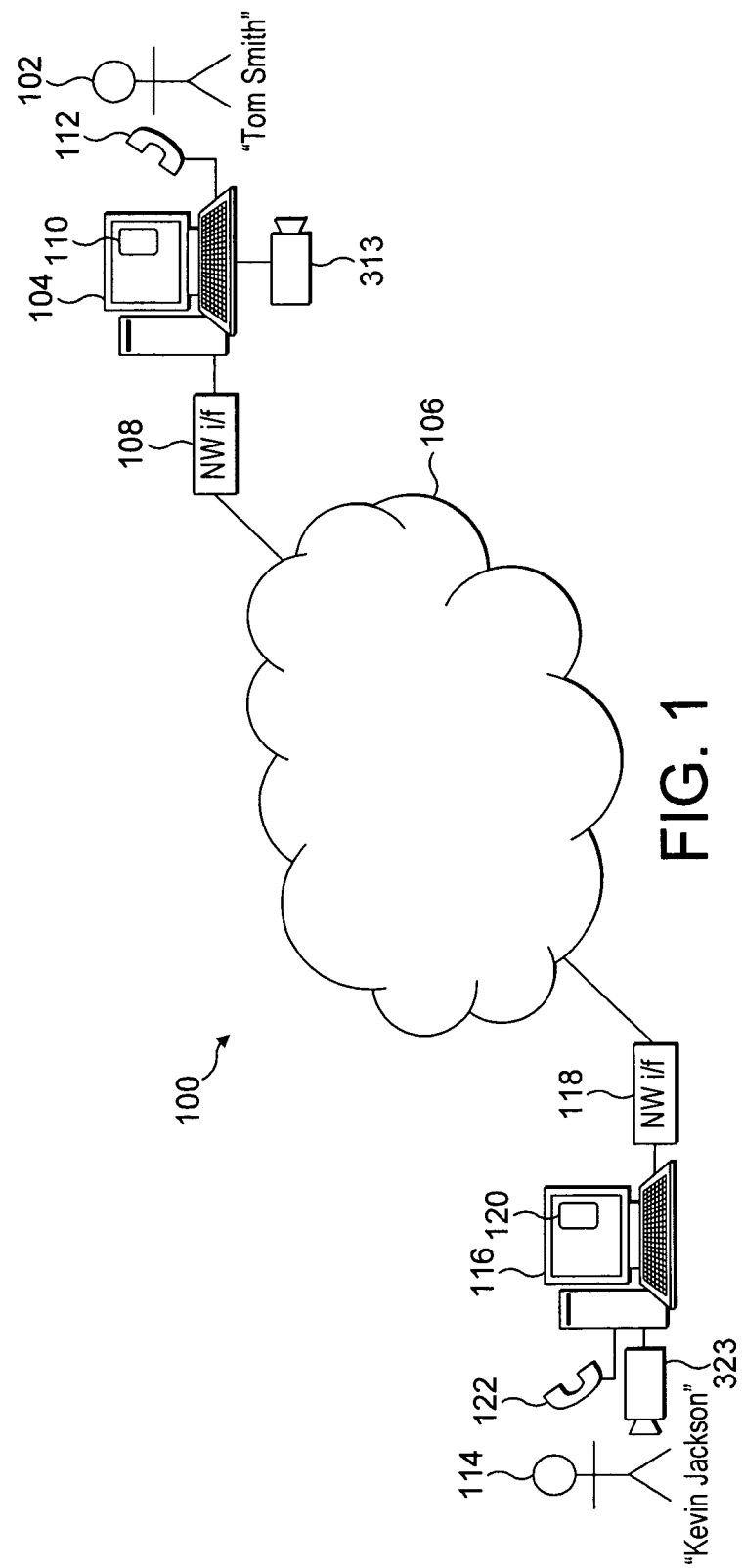
FIG. 1 shows a packet-based communication system.

Reference is first made to FIG. 1, which illustrates a P2P communication system 100. Note that whilst this illustrative embodiment is described with reference to a P2P communication system, other types of communication system could also be used, such as non-P2P video systems. A first user of the P2P communication system (named "Tom Smith" 102) operates a first user terminal 104, which is shown connected to a P2P network 106. Note that the P2P network 106 utilises a communication system such as the Internet. The user terminal 104 may be, for example, a personal computer ("PC"), personal digital assistant ("PDA"), a mobile phone, a gaming device or other embedded device able to connect to the P2P network 106. This user device is arranged to receive information from and output information to a user of the device. In a preferred embodiment of the invention the user device comprises a display such as a screen or monitor, and a keyboard and mouse. The user device 104 is connected to the P2P network 106 via a network interface 108 such as a modem, and the connection between the user terminal 104 and the network interface 108 may be via a cable (wired) connection or a wireless connection.

The user terminal 104 is running a client 110, provided by the P2P software provider. The client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, or as a separate loudspeaker and microphone independently connected to the user terminal 104. The user terminal 104 is also connected a video camera 313 such as a web-cam.

The second user's terminal 116 may comprise similar elements, handset 122, client application 120, network interface 118, and video camera 323.

Figure 2:
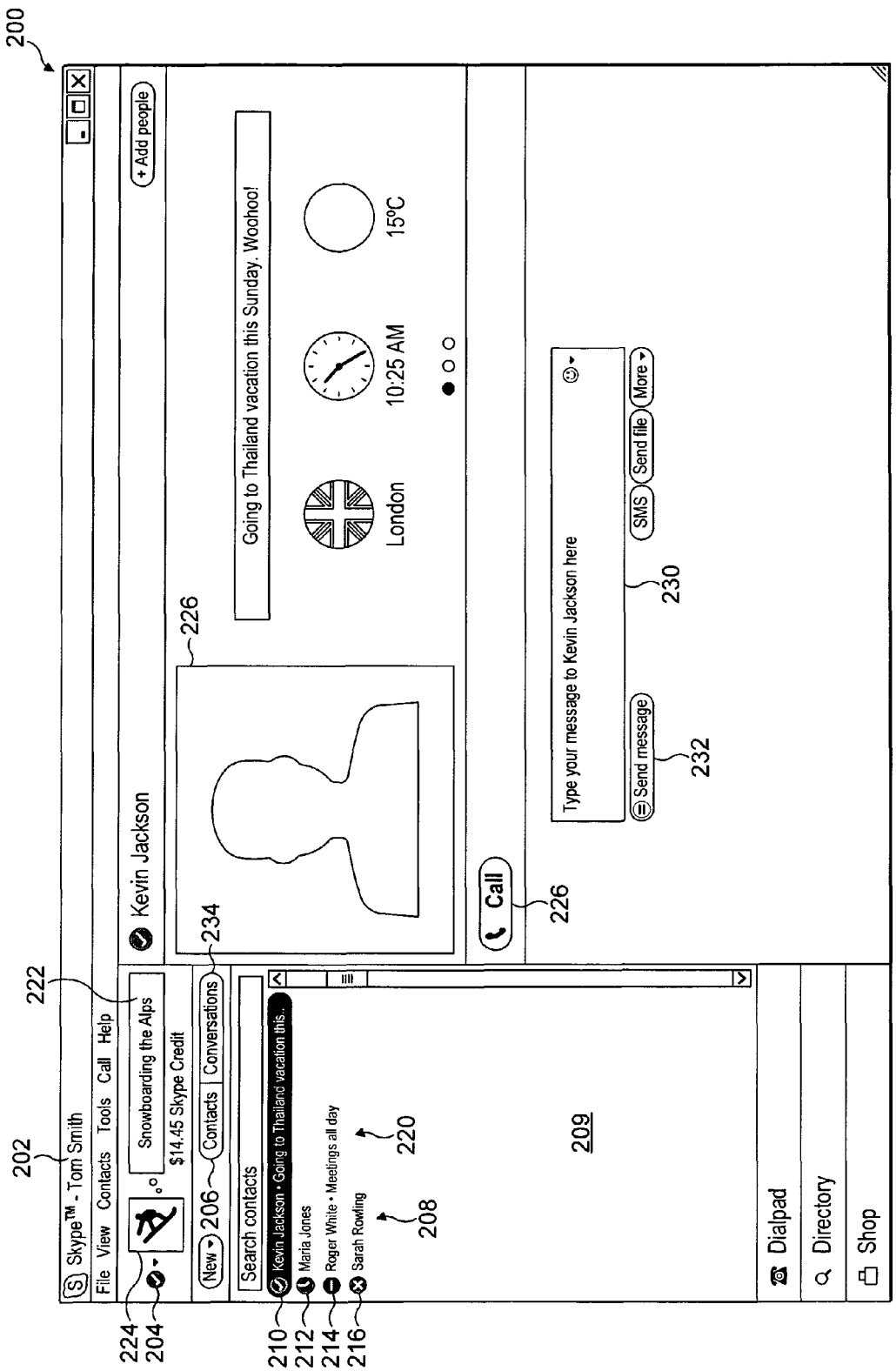
FIG. 2 shows a user interface of a communication client.

An example of a user interface 200 of the client 110 executed on the user terminal 104 of the first user 102 is shown illustrated in FIG. 2. The client user interface 200 displays the username 202 of "Tom Smith" 102 in the P2P system, and the user can set his own presence state (that will be seen by other users) using a drop down list by selecting icon 204.

The client user interface 200 comprises a button 206 labelled "contacts", and when this button is selected the contacts stored by the user in a contact list are displayed in a pane 209 below the button 206. In the example user interface in FIG. 2, four contacts of other users of the P2P system are shown listed in contact list 208. Each of these contacts have authorised the user of the client 110 to view their contact details and online presence and mood message information. Each contact in the contact list has a presence status icon associated with it. For example, the presence status icon for "Kevin Jackson" 210 indicates that this contact is "online", the presence icon for "Maria Jones" 212 indicates that this contact is "not available", the presence icon for "Roger White" 214 indicates that this contact's state is "do not disturb", the presence icon for "Sarah Rowling" 216 indicates that this contact is "offline". Further presence indications can also be included. Next to the names of the contacts in pane 209 are mood messages 220 of the contacts.

The contact list for the users (e.g. the contact list 208 for "Tom Smith") is stored in a contact server (not shown in FIG. 1). When the client 110 first logs into the P2P system the contact server is contacted, and the contact list is downloaded to the user terminal 104. This allows the user to log into the P2P system from any terminal and still access the same contact list. The contact server is also used to store the user's own mood message (e.g. a mood message 222 of the first user 102) and a picture 224 selected to represent the user (known as an avatar). This information can be downloaded to the client 110, and allows this information to be consistent for the user when logging on from different terminals. The client 110 also periodically communicates with the contact server in order to obtain any changes to the information on the contacts in the contact list, or to update the stored contact list with any new contacts that have been added. Presence information is not stored centrally in the contact server. Rather, the client 110 periodically requests the presence information for each of the contacts in the contact list 208 directly over the P2P system. Similarly, the current mood message for each of the contacts, as well as a picture (avatar—e.g. picture 226 for "Kevin Jackson") that has been chosen to represent the contact, are also retrieved by the client 110 directly from the respective clients of each of the contacts over the P2P system.

Calls such as video calls to the P2P users in the contact list may be initiated over the P2P system by selecting the contact and clicking on a "call" button 228 using a pointing device such as a mouse. Referring again to FIG. 1, the call set-up is performed using proprietary protocols, and the route over the network 106 between the calling user and called user is determined by the peer-to-peer system without the use of servers. For example, the first user 102 can call a second user "Kevin Jackson" 114.

Following authentication through the presentation of digital certificates (to prove that the users are genuine subscribers of the P2P system—described in more detail in WO 2005/009019), the call can be made using packet based communications, e.g. using IP. The client 110 performs the encoding and decoding of video IP packets. Video IP packets from the user terminal 104 are transmitted into the network 106 via the network interface 108, and routed to a computer terminal 116 of the called party 114, via a network interface 118. A client 120 (similar to the client 110) running on the user terminal 116 of the called user 114 decodes the video IP packets to produce an audio and video signal that can be heard and seen by the called user on their terminal 116. Conversely, when the second user 114 transmits video, the client 120 executed on user terminal 116 encodes the audio and video signals into video IP packets and transmits them across the network 106 to the user terminal 104. The client 110 executed on user terminal 104 decodes the video IP packets, and produces an audio-video signal that can be heard by the user of the handset 112 and seen on their display.

The video packets for calls between P2P users (such as 102 and 114) as described above are passed across the network 106 only, and the PSTN network is not involved. Furthermore, due to the P2P nature of the system, the actual video calls between users of the P2P system can be made with no central servers being used. This has the advantages that the network scales easily and maintains a high voice quality, and the call can be made free to the users.

In addition to making video calls, the user of the client 110 can also communicate with the users listed in the contact list 208 in several other ways. For example, an instant message (also known as a chat message) can be sent by typing a message in box 230 and sending it by selecting the "send message" button 232. Additionally, the first user 102 can use the client 110 to transmit files to users in the contact list 208, send voicemails to the contacts or establish pure voice calls with the contacts (not illustrated in FIG. 2).

Figure 3:
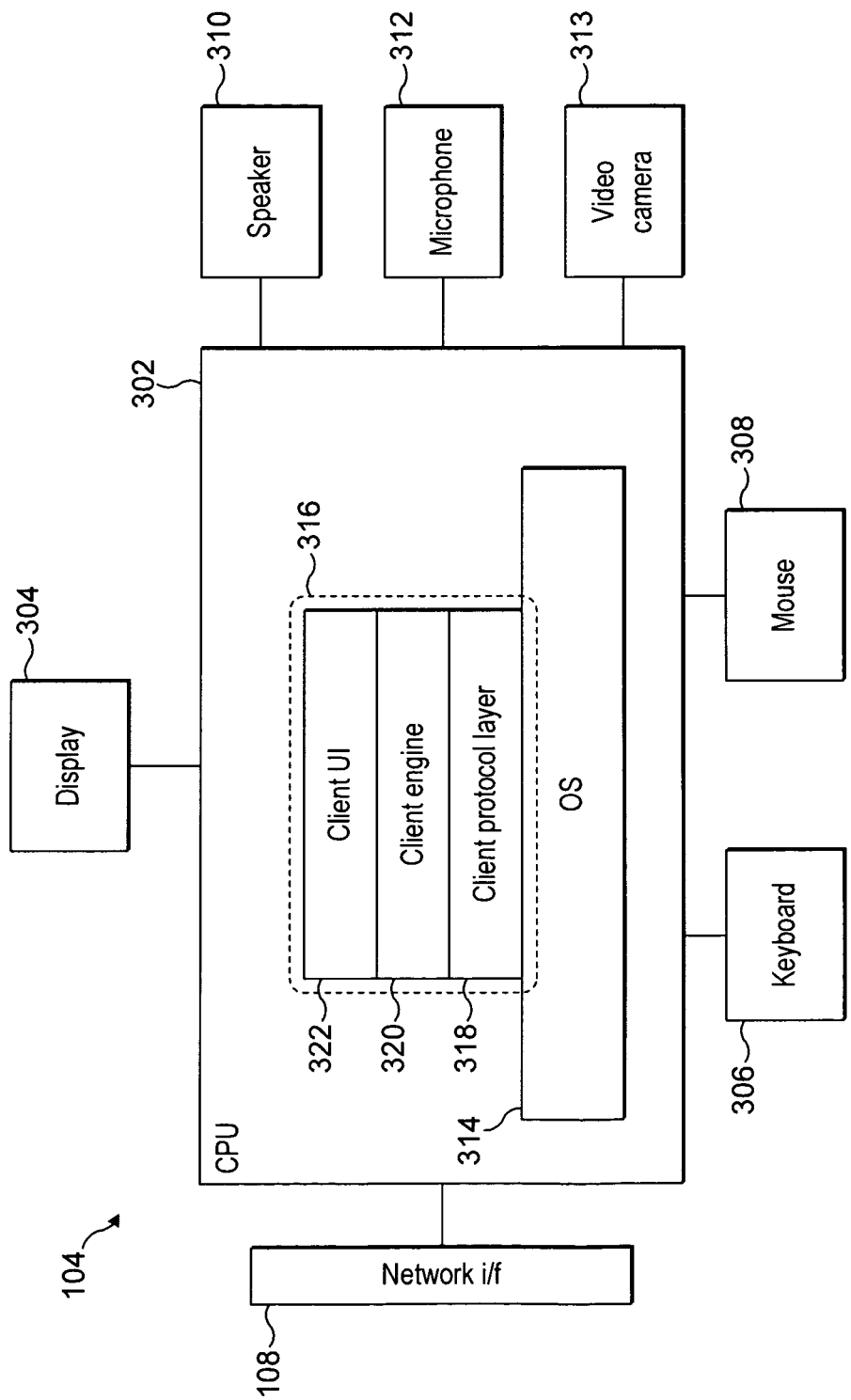
FIG. 3 shows a user terminal on which is executed a communication client.

FIG. 3 illustrates a detailed view of the user terminal (104) on which is executed client 110. The user terminal 104 comprises a central processing unit ("CPU") 302, to which is connected a display 304 such as a screen, an input device such as a keyboard 306, a pointing device such as a mouse 308, a speaker 310, a microphone 312, and a video camera 313. The speaker 310 and microphone 312 may be integrated into a handset 112 or headset, or may be separate. The CPU 302 is connected to a network interface 108 as shown in FIG. 1.

FIG. 3 also illustrates an operating system ("OS") 314 executed on the CPU 302. Running on top of the OS 314 is a software stack 316 for the client 110. The software stack shows a protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 318 of the client software communicates with the operating system 314 and manages the connections over the P2P system. Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface.

Figure 4A:
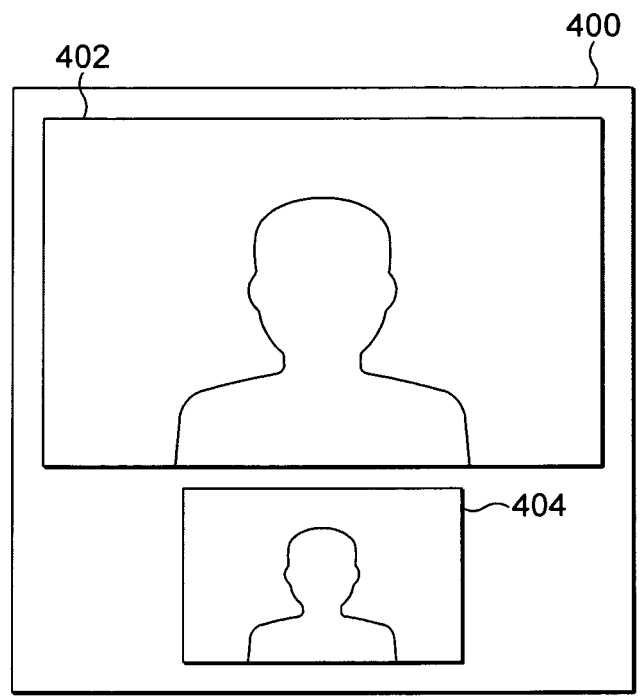
FIG. 4a shows a terminal display area layout.
Figure 4B:
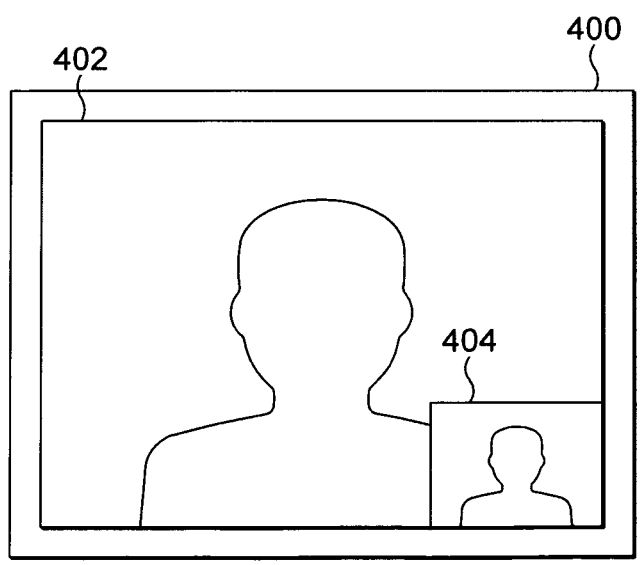
FIG. 4b shows an alternative terminal display area layout.

As illustrated in FIGS. 4a and 4b, the first user's terminal 104 has available a display area 400 for displaying video. This display area 400 could be a panel in the client front-end 200, a separate window from the client, or a full-screen display. The user may select between two or more of these display options.

The display area 400 comprises a larger, first video area 402 (the main video area) which displays video data received from the second terminal 116, typically representing images of the second user 114, captured by the second user using the second terminal's camera 323.

The display area 400 also comprises a smaller, second video area 404 (the preview video area) which displays video data generated by the first terminal 104 itself for transmission to the second terminal 116, typically representing images of the first user 102, captured by the first user using the first terminal's camera 313.

Similarly, the second user's terminal 116 also has available a display area comprising a respective first, larger video area which displays video data received from the first terminal 104; and a respective second, smaller video area which displays video data generated by the second terminal 116 itself for transmission to the first terminal 104. The following will be described from the point of view of the first terminal 104 only, but it will be understood that the same can equally apply the other way around from the point of view of the second terminal 116, or indeed any terminal of the overall network.

There are two preferred ways to arrange the main area 402 and preview area 404 relative to one another. The one shown in FIG. 4a is referred to as the "video-below" layout, whereby the main area 402 and preview area 404 are separate and mutually exclusive of one another, in this case with the preview area 404 below the main area 402 (although they could be the other way up or side by side). The other way shown in FIG. 4b is referred to as the "picture-in-picture" layout, whereby the preview area 404 is entirely within the main area 402.

In the case of FIG. 4b (picture-in-picture), the preview area 404 may be said to overlap the main area 402 (although of course the pixels of the preview video image do not actually "overlap" those of the main video image, but rather are displayed in place of pixels of the main video image in a part of the main area 402).

The user may resize the main area 402 by controlling the cursor. Alternatively, the user may resize the main area 402 by selecting a window size option from a drop down menu. In embodiments, the preview area 404 may also change in size, either automatically with the size of the first area 402 or as selected by the user.

The first and second areas 402 and 404 are preferably square or rectangular, and may have a variable ratio of height to width, or a fixed ratio.

The client application 110 scales the received video data to the first area 402 and scales the locally-generated preview video data to the second area 404, and displays the received data and preview data in those areas respectively.

As discussed below, in the preferred embodiments the preview image of the caller is displayed within the received video image when there is sufficient space in the total display area 400 to accommodate two separate areas. The preview image is automatically moved out of the received video display area when there is sufficient space, allowing the user to view an un-obscured image of the received video.

The changing dimensions of the main area 402 are provided to the client engine 320. Preferably the client engine determines a measure of the difference between the sizes of the available display area 400 and the selected first area 402, such as a difference in width, height or total area (e.g. width multiplied by height). When the client engine determines that this difference is greater than a threshold value then the preview image of the user from the local webcam 313 is displayed in a separate area, i.e. the preview area 404 is outside of the main area 402. Otherwise there is insufficient space for such a layout and the preview area 404 is placed within the main area 402. The choice of threshold value may depend on the particular implementation.

In embodiments, the video sizes may be remembered by the client application between sessions, i.e. so the client engine stores the size settings from one video call and then automatically re-loads those size settings for use in a subsequent video call. Thus if a user manually resizes the main area 402 during a call, then there is no need for a user to reselect the size of the main area 402 again during the next call. A user may also re-size the window between calls if they wish, and again those settings will be remembered for the next call.

In one example embodiment, the main area 402 may have a default size of 640×480 pixels, a minimum size of 320×240 pixels, and a maximum size of full-screen. The preview area 404 may have a default size of 160×120 pixels, a minimum size of 100×75 pixels, and a maximum size of 240×180 in either layout mode. Additionally in the picture-in-picture layout of FIG. 4b, the maximum width of the preview area 404 may be one quarter of the main area 402.

Figure 4C:
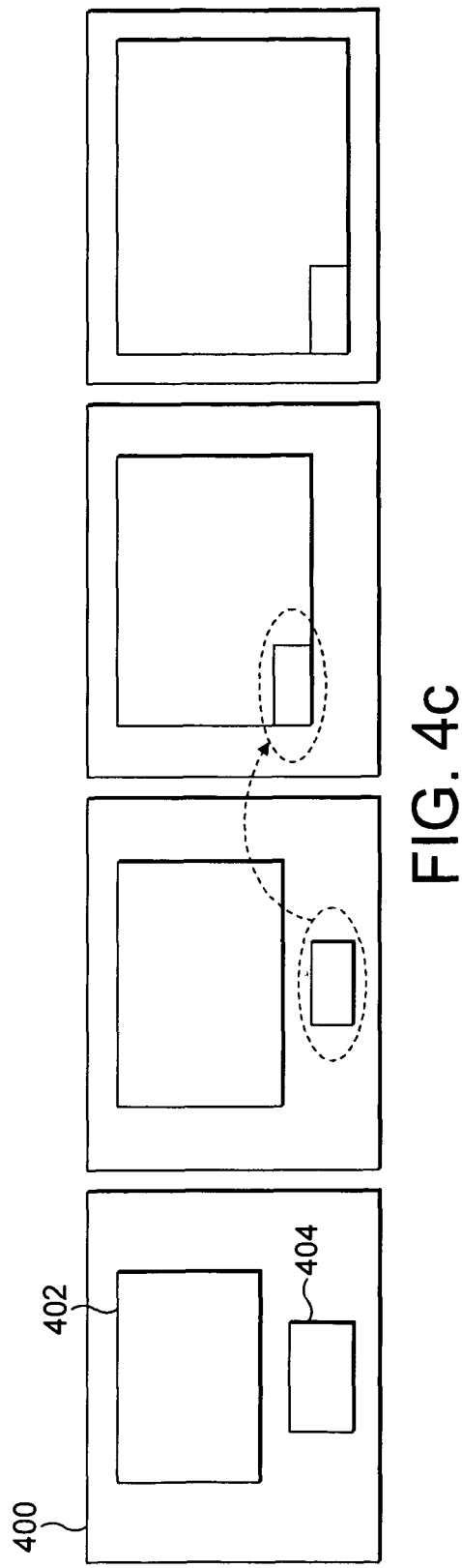
FIG. 4c shows a sequence of display layouts.

A stage-by-stage scaling up of the main area is shown in FIG. 4c, from left to right. At first, in the layout shown far left, the main area 402 is relatively small, allowing plenty of space for a relatively large preview area 404 below the main area 402 (although still smaller than the main area 402). Then, in the layout shown second from left, the user increases the size of the main area 402, but with still enough space to show a reduced size preview area 404 below the main area 402. Then, in the layout shown second from right, the user increases the size of the main area 402 again, to such an extent that there is not enough space to display the two areas separately and the preview area 404 is moved to a box in the bottom left corner of the main area 402. Then, in the layout shown far right, the user increases the size of the main area 402 again, and the preview area 404 moves with it to stay in bottom left corner.

Figure 5:
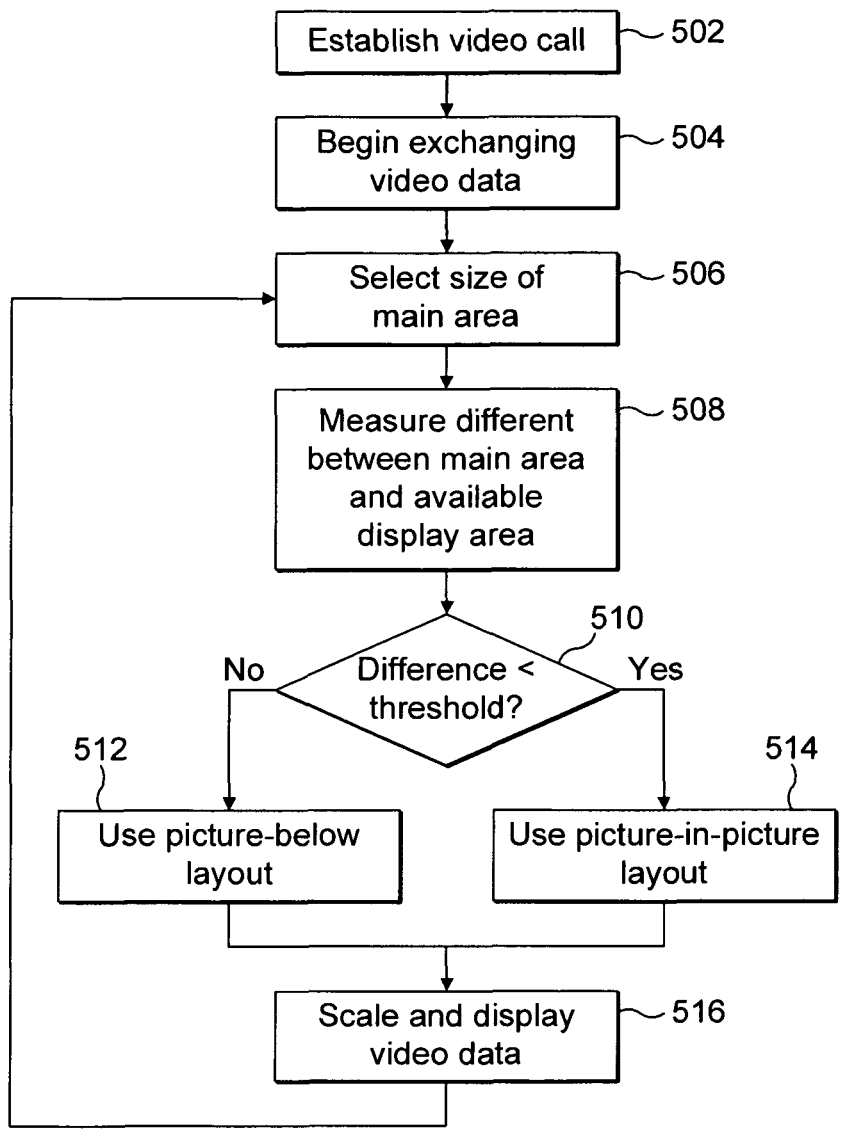
FIG. 5 is a flow chart of a display layout decision process.

A method according to a preferred embodiment is now described with reference to the flow chart of FIG. 5. At step S502, one of the first and second users 102 and 114 establishes a video call. At step S504, the first terminal 104 and second terminal 116 begin to generate video data captured using the cameras 313 and 323 of their respective users 102 and 114, and to exchange that data between them. This exchange is ongoing throughout the call.

At step S506 the size of the main video area 402 is selected. This could for example be selected by the user, or a stored selection recalled from a previous session, or a default size used on start-up. Then at step S508, the client engine compares the size of the main area 402 the size of the total display area 400 available for displaying video, for example by measuring a difference in height, width or area. At step S510 the client engine determines whether this measure is less than a threshold value. If not, there is sufficient space in the display area 400 to display the received and locally-generated video images in two separate areas, and so the method branches to step S512 where the picture-below layout of FIG. 4a is automatically selected by the client engine. If the measure is less that the threshold however, then there is insufficient space and the method branches instead to step S514 where the client engine selects the picture-in-picture layout of FIG. 4b.

At step S516, the client application scales and displays the received video data in the main area 402, and the locally-generated video data in the preview area 404, according to whichever layout is selected. The exchange of video data between the first and second terminals 104 and 116, and their display in the respective video areas, then continues throughout the call using the selected layouts. If at any time the user selects to resize the main area 404, then the method returns to step S506 from whence the layout selection procedure is repeated.

It will be appreciated that the above embodiments are described only by way of example. For instance, the invention may have applications other than to a packet based or P2P communication system. Further, instead of selecting between discrete video-below and picture-in-picture layouts, the preview area could move so as to increasingly overlap with the main area as the main area increases in size. Or more generally, the layout could be automatically rearranged to a more efficient use of space for the selected main area size, e.g. by moving the preview area from below the main area to the side of the main area in dependence on the main area's ratio of width to height. Other applications and configurations may be apparent to the person skilled in the art given the disclosure herein. The scope of the invention is not limited by the described embodiments, but only by the following claims.

What is claimed is:

1. A method of processing video data in a video communication system, the method comprising:
    receiving first video data at a first terminal from a second terminal;
    generating second video data at the first terminal for transmission to the second terminal;
    selecting a size of a first video area for displaying the first video data within a display area of the first terminal;
    scaling the first video data to the selected size of the first video area and displaying the first video data therein;
    determining a second video area for displaying the second video data within the display area of the first terminal, the determination of the second video area comprising at least determining a location of the second video area relative to the first video area, by determining an overlap of the second video area over the first video area in dependence on the size of the first video area;
    scaling the second video data to the second video area; and
    responsive to the scaling of the second video data to the second video area, automatically displaying the second video data in the second video area such that the second video data in the second video area at least partially overlaps the first video area in accordance with the dependence on the size of the first video area.

2. The method of claim 1,
    the method further comprising determining a difference between the size of the first video area and a size of the display area of the first terminal; and
    the determination of said overlap comprises determining an overlap of the second video area over the first video area in dependence on said difference.

3. The method of claim 2,
    the method further comprising comparing said difference to a threshold; and
    the determination of said overlap comprises determining that, based on the comparing, the second video area overlaps the first video area if said difference is less than the threshold.

4. The method of claim 1, wherein the determination of said difference comprises determining a difference between a width of the first video area and a width of the display area.

5. The method of claim 1, wherein the determination of said difference comprises determining a difference between a height of the first video area and a height of the display area.

6. The method of claim 1, wherein the determination of said difference comprises determining a difference between an area of the first video area and an area of the display area.

7. The method of claim 1, wherein the determination of the second video area comprises determining the size of the second video area in dependence on the size of the first video area.

8. The method of claim 1, comprising establishing a video call, wherein the reception of the first data comprises receiving real-time video data captured by a user of the second terminal, and the generation of the second data comprises generating real-time video data captured by a user of the first terminal, the second display area being a preview area allowing the user of the first terminal to view the second video data which is to be transmitted to the second user.

9. The method of claim 1, wherein the display area is one of: a panel of a client application running on the first terminal, a window separate from a client application running on the first terminal, and a full-screen of the first terminal.

10. The method of claim 1,
    the method further comprising selecting the display area of the first terminal; and
    the determination of the second video area comprises determining a difference between the size of the first video area and a size of the selected display area.

11. The method of claim 10, wherein said selection comprises selecting the display area from one of: a panel of a client application running on the first terminal, a window separate from a client application running on the first terminal, and a full-screen of the first terminal.

12. The method of claim 1, wherein the size of the first area is selected by a user.

13. The method of claim 1, wherein the video communication system comprises a packet-based communication network, said receipt of the first video data comprises receiving the first video data from the second terminal via the packet-based communication network, and said generation of the second video data comprises generating the second video data for transmission to the second terminal via the packet-based communication network.

14. The method of claim 13, wherein the video communication system comprises a peer-to-peer network, said receiving comprises receiving the first video data from the second terminal via the peer-to-peer network, and said generation of the second video data comprises generating the second video data for transmission to the second terminal via the peer-to-peer network.

15. A computer program product encoded on computer readable storage media, the program comprising code which when executed on a processor of a computing device performs the steps of claim 1.

16. A first user terminal comprising:
    reception means for receiving first video data from a second terminal;
    transmission means for transmitting second video data generated at the first terminal to the second terminal;
    a display;
    a processor coupled to the display, reception means and transmission means; and storage means storing code of a client application and arranged to supply the code to the processor for execution, the code being configured, when executed by the processor, to:
- select a size of a first video area for displaying the first video data within a display area of said display;
- scale the first video data to the selected size of the first video area and display the first video data therein;
- determine a second video area for displaying the second video data within the display area of the display, the determination of the second video area comprising at least determining a location of the second video area relative to the first video area, by determining an overlap of the second video area over the first video area in dependence on the size of the first video area;
- scale the second video data to the second video area; and
- responsive to the scale of the second video data to the second video area, automatically display the second video data in the second video area such that the second video data in the second video area at least partially overlaps the first video area in accordance with the dependence on the size of the first video area.

17. The terminal of claim 16, wherein:
the code is further configured to determine a difference between the size of the first video area and a size of said display area; and
the determination of said overlap comprises determining an overlap of the second video area over the first video area in dependence on said difference.

18. The terminal of claim 17, wherein:
the code is further configured to compare said difference to a threshold; and
the determination of said overlap comprises determining that, based on the comparing, the second video area overlaps the first video area if said difference is less than the threshold.

19. The terminal of claim 16, wherein the determination of said difference comprises determining a difference between a width of the first video area and a width of said display area.

20. The terminal of claim 16, wherein the determination of said difference comprises determining a difference between a height of the first video area and a height of said display area.

21. The terminal of claim 16, wherein the determination of said difference comprises determining a difference between an area of the first video area and an area of said display area.

22. The terminal of claim 16, wherein the determination of the second video area comprises determining the size of the second video area in dependence on the size of the first video area.

23. The terminal of claim 16, wherein:
the terminal comprises a video camera arranged to generate the first video data in real-time, captured by a user of the camera of the first terminal;
the code is further configured to establish a video call requested by a user;
the first data comprises receiving real-time video data captured by a user of the second terminal; and
the second display area is a preview area allowing the user of the first terminal to view the second video data which is to be transmitted to the second user.

24. The terminal of claim 16, wherein the display area is one of: a panel of a client application running on the first terminal, a window separate from a client application running on the first terminal, and a full-screen of the first terminal.

25. The terminal of claim 16, wherein:
said display area is arranged to be selectable by a user; and
the determination of the second video area comprises determining a difference between the size of the first video area and a size of the selected display area.

26. The terminal of claim 25, wherein said display area is selectable from one of: a panel of a front-end of the client application displayed when executed on the processor, a window separate from the front-end of the client application, and a full-screen of said display.

27. The terminal of claim 16, wherein the size of the first area is selectable by a user.

28. The terminal of claim 16, wherein the reception means is configured to receive the first video data from the second terminal via a packet-based communication network, and the transmission means is configured to transmit the second video data to the second terminal via the packet-based communication network.

29. A communication system comprising a communication network, a user first terminal, and a second user terminal coupled to the first terminal via the communication network, wherein:
the first terminal is arranged to receive first video data from the second terminal via the communication network;
the first terminal is arranged to generate second video data and transmit the second video data to the second terminal via the communication network; and
the first terminal comprises a display, a processor coupled to the display, and storage means storing code of a client application and arranged to supply the code to the processor for execution, the code being configured so as when executed by the processor to:
- select a size of a first video area for displaying the first video data within a display area of said display;
- scale the first video data to the selected size of the first video area and display the first video data therein;
- determine a second video area for displaying the second video data within the display area of the display, the determination of the second video area comprising at least determining a location of the second video area relative to the first video area, by determining an overlap of the second video area over the first video area in dependence on the size of the first video area;
- scale the second video data to the second video area; and
- responsive to the scale of the second video data to the second video area, automatically display the second video data in the second video area such that the second video data in the second video area at least partially overlaps the first video area in accordance with the dependence on the size of the first video area.

* * * * *